(12) United States Patent
Fornage et al.

(10) Patent No.: US 9,780,645 B2
(45) Date of Patent: Oct. 3, 2017

(54) METHOD AND APPARATUS FOR PROVIDING POWER CONVERSION USING AN INTERLEAVED FLYBACK CONVERTER WITH REACTIVE POWER CONTROL

(71) Applicant: Enphase Energy, Inc., Petaluma, CA (US)

(72) Inventors: Martin Fornage, Petaluma, CA (US); Michael Harrison, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 264 days.

(21) Appl. No.: 14/313,255

(22) Filed: Jun. 24, 2014

(65) Prior Publication Data

US 2014/0376278 A1 Dec. 25, 2014

Related U.S. Application Data

(60) Provisional application No. 61/839,134, filed on Jun. 25, 2013.

(51) Int. Cl.
| | |
|---|---|
| *H02M 1/42* | (2007.01) |
| *H02M 7/48* | (2007.01) |
| *H02M 3/335* | (2006.01) |
| *H02M 1/24* | (2006.01) |
| *H02M 1/12* | (2006.01) |

(Continued)

(52) U.S. Cl.
CPC ............... *H02M 1/42* (2013.01); *H02M 1/12* (2013.01); *H02M 1/14* (2013.01); *H02M 1/24* (2013.01); *H02M 3/285* (2013.01); *H02M 3/335* (2013.01); *H02M 3/3353* (2013.01);

(Continued)

(58) Field of Classification Search
CPC ............... H02M 1/12; H02M 1/14–2001/4291
See application file for complete search history.

(56) References Cited

U.S. PATENT DOCUMENTS

| 8,488,352 B1 | 7/2013 | Huang et al. |
| 8,638,581 B2 | 1/2014 | Zacharias et al. |

(Continued)

FOREIGN PATENT DOCUMENTS

| WO | WO-2012122454 A1 | 9/2012 |
| WO | WO-2012142461 A1 | 10/2012 |

OTHER PUBLICATIONS

JP-2004320859; Onose Takayuki; Reactive Power Compensator; Apr. 14, 2003.*

(Continued)

*Primary Examiner* — Timothy J Dole
*Assistant Examiner* — Ishrat Jamali
(74) *Attorney, Agent, or Firm* — Moser Taboada (57) ABSTRACT

A method and apparatus for converting DC input power to DC output power with reactive power control. The apparatus includes a plurality of flyback circuits, coupled in parallel, and a DC-AC inversion circuit coupled across an output of each flyback circuit of the plurality of flyback circuits. The apparatus also including a reactive power control circuit coupled to an output of one flyback circuit of the plurality of flyback circuits, and across an output of the DC-AC inversion circuit; and a controller operative to coordinate timing of switches in each flyback circuit of the plurality of flyback circuits and the reactive power control circuit to generate AC output power of a desired power factor.

20 Claims, 6 Drawing Sheets

(51) Int. Cl.
*H02M 1/14* (2006.01)
*H02M 3/28* (2006.01)
*H02M 1/00* (2006.01)

(52) U.S. Cl.
CPC .... *H02M 7/4807* (2013.01); *H02M 2001/007* (2013.01); *Y02B 70/12* (2013.01)

(56) References Cited

U.S. PATENT DOCUMENTS

| | | | |
|---|---|---|---|
| 8,653,689 | B2 | 2/2014 | Rozenboim |
| 2005/0207189 | A1* | 9/2005 | Chen ........................ H02M 1/40 363/21.15 |
| 2009/0086514 | A1* | 4/2009 | Fornage ............ H02M 3/33507 363/21.17 |
| 2010/0067271 | A1 | 3/2010 | Garces et al. |
| 2010/0085035 | A1* | 4/2010 | Fornage ............. G01R 19/2513 324/76.12 |
| 2010/0308662 | A1* | 12/2010 | Schatz .................... H02J 3/385 307/80 |
| 2012/0236616 | A1 | 9/2012 | Zacharias et al. |
| 2014/0328415 | A1* | 11/2014 | Gumaer ................ H04B 3/542 375/257 |
| 2015/0333637 | A1* | 11/2015 | Izumi ..................... H02M 1/32 363/21.01 |

OTHER PUBLICATIONS

JP-2013004765; Tatsuya Izumi; AC-DC Bi-directionally Conversion Device With Failure Determination Function, Failure Determination Method and Computer Readable Medium; Jan. 15, 2013.*

* cited by examiner

METHOD AND APPARATUS FOR PROVIDING POWER CONVERSION USING AN INTERLEAVED FLYBACK CONVERTER WITH REACTIVE POWER CONTROL

CROSS-REFERENCE TO RELATED APPLICATION

This application claims priority to U.S. Provisional Patent Application No. 61/839,134 filed on Jun. 25, 2013, which is incorporated by reference herein in its entirety.

BACKGROUND OF THE INVENTION

Field of the Invention

Embodiments of the present invention generally relate to a method and apparatus for converting DC input power to AC output power with reactive power control.

Description of the Related Art

A power factor (PF) of an AC electrical power system is defined as the ratio of real power flowing to a load versus the apparent (or reactive) power of the circuit. Distributed generators (e.g., photovoltaic (PV) panels, wind turbines, and the like) rely on power converters such as flyback converters to convert DC power to AC power. Such DC-AC inverters in PV applications have been traditionally required by legislation to only supply real power with no reactive power, hence for any converted power, the power factor is typically required to be at or near unity.

With increasing use of renewable energy generation there is a need to allow power network operators to exercise the control over the new sources renewable energy just as well as conventional sources of energy generation. Accordingly, DC-AC inverters, for example, for PV applications must be able to provide what is known as "reactive support". The inverters must be capable to deliver not only real power, but also a predetermined amount of reactive power. The amount of reactive power cumulatively supports the power on the AC grid and allows DC power from distributed generators to more effectively contribute power to the AC grid.

Therefore, a need exists in the art for a method and apparatus for providing power conversion using converters with reactive power control.

SUMMARY OF THE INVENTION

Embodiments of the present invention generally relate to a method and apparatus for providing power conversion using an interleaved flyback converter with reactive power control substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention allow storage of energy for reverse power to flow from an auxiliary circuit in a reactive power support mode for selectively inputting DC power back into a power converter for reactive power support. The periods of input correspond to time periods where a component (e.g., a slave transformer) is not in operation. Diodes in the auxiliary circuit prevent discharge of energy storage during a non-reactive power mode, and forward power operation in the reactive power support mode (e.g., forward power from a DC input port) of the power converter. Thus, the power converter (e.g., a DC-AC inverter) operates in either a non-reactive power mode or a reactive power support mode. The non-reactive power mode comprises periods of forward power operation. The reactive power support mode comprises periods of forward power operation, and periods of reverse power operation.

Figure 1:
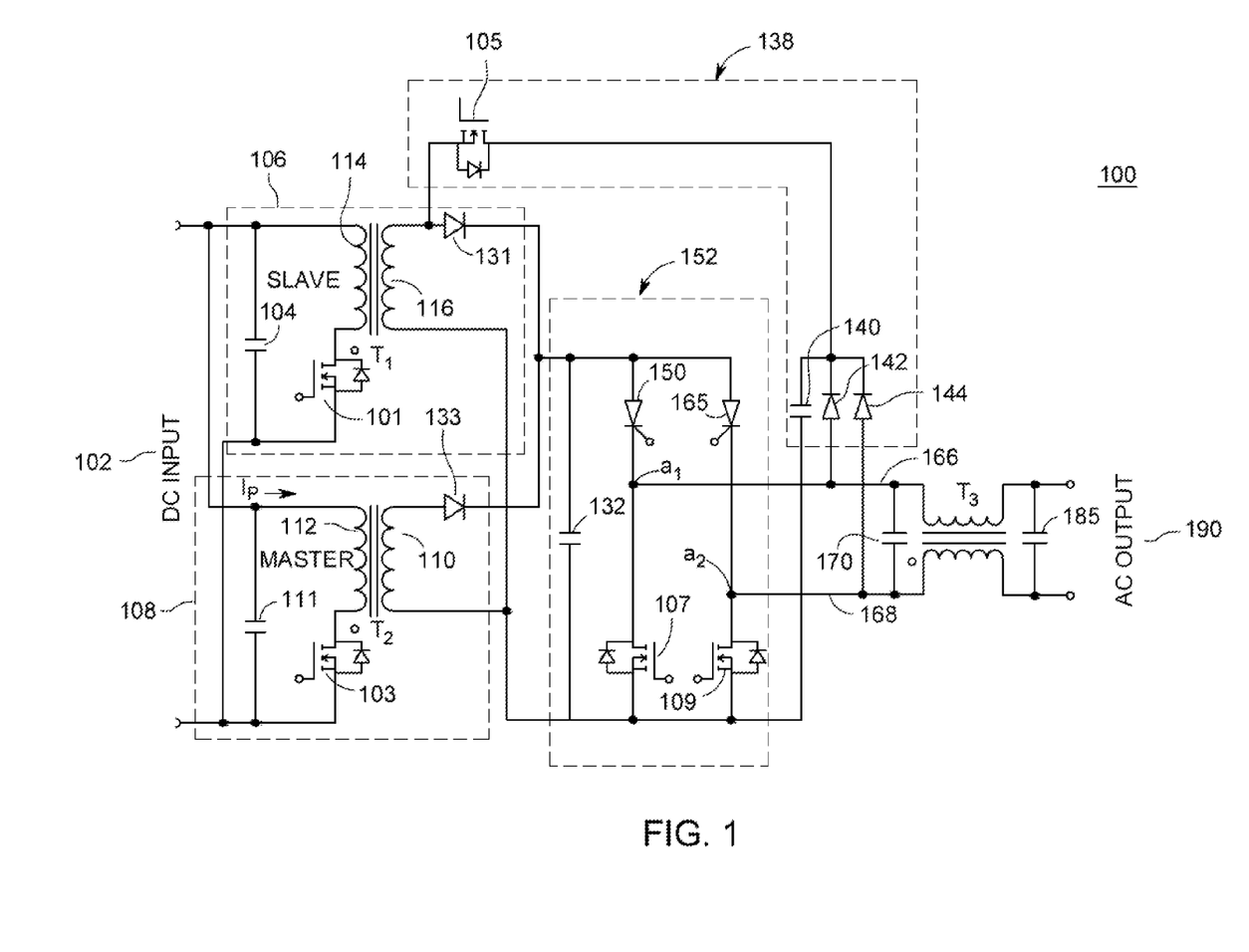
FIG. 1 is a schematic diagram of a power converter in accordance with one or more embodiments of the present invention.

FIG. 1 is a schematic diagram of a power converter 100 in accordance with one or more embodiments of the present invention. This diagram portrays one variation of the myriad of possible DC-AC converter configurations. The present invention can function in a variety of power conversion environments including photovoltaic systems, wind turbine systems, power converters, and other systems requiring DC-AC power conversion. The power converter 100 is comprised of switches depicted as transistors (e.g., n-type metal-oxide-semiconductor field-effect transistors, or MOS-FETs). Although switches are depicted with diodes across each respective source and drain, the diodes represent an intrinsic property of the FET. However, further embodiments may include physical diodes across the source and drain.

Figure 2:
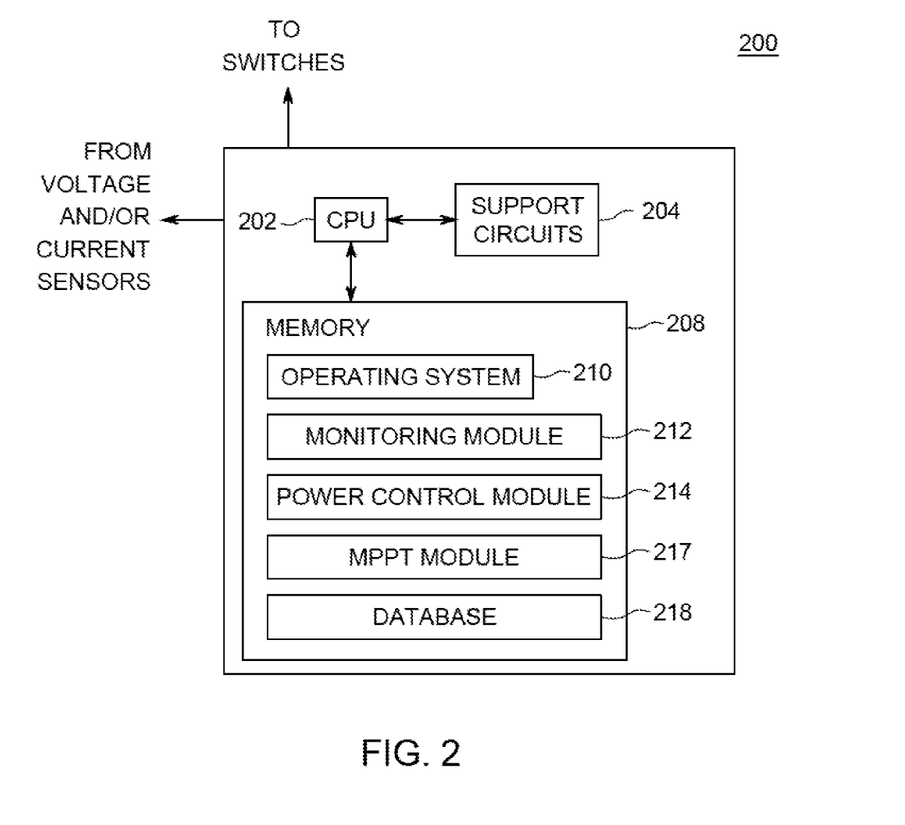
FIG. 2 is a block diagram of an exemplary controller in accordance with one or more embodiments of the present invention.

The power converter 100 (an interleaved flyback converter with reactive power support) comprises a plurality of flyback circuits such as a flyback circuit 106 (a "slave" circuit) and a flyback circuit 108 (a "master" circuit) coupled to a controller (discussed further in FIG. 2). The power converter 100 comprises a DC-DC converter circuit (comprised of flyback circuits 106 and 108), a DC-AC inversion circuit 152, and a reactive power control circuit 138. The flyback circuits 106 and 108 have inputs coupled across the DC input 102. The controller (not shown) also controls the switches of the DC-AC inversion circuit 152 and the reactive power control circuit 138.

The interleaved flyback circuits 106 and 108 reduce ripple current in the output power, double the ripple frequency to facilitate simplified filtering to remove undesirable ripple current, and double the output power of the converter 100. Interleaving functions best when the activation and deactivation cycles of each flyback circuit 106 and 108 are exactly 180 degrees out of phase. For embodiments of the present invention to achieve automatic balancing and timing accuracy, the conversion frequency of the converter 100 must be dependent upon the current (Ip) through the transformer primary winding 112 of the flyback circuit 108.

The flyback circuit 106 comprises a transformer T1, a switch 101, a capacitor 104 and a diode 131. The primary winding 114 of the transformer T1 is coupled in series to the switch 101 and the series combination is coupled in parallel with the capacitor 104. The secondary winding 116 of the transformer T1 is coupled to a switch 105 (the switch 105 is part of the reactive power control circuit 138) and through the diode 131 to the DC-AC inversion circuit 152. The source of the switch 101 is coupled to ground as well as to a first terminal of the DC input 102, and the drain of the switch 101 is coupled to the primary winding 114 of the transformer T1. The intrinsic body diode of 101 will operate as a rectifier device. A capacitor 104 is coupled across the input to the flyback circuit 106 such that one terminal of the capacitor 104 is coupled to one terminal of the primary winding 114 of the switch 101, and the second terminal of the capacitor 104 is coupled to the source of the switch 101 (i.e., ground).

The second flyback circuit 106 comprises a transformer T2, a switch 103, a capacitor 111 and a diode 133. The primary winding 112 of the transformer T2 is coupled in series to the switch 103 and the series combination is coupled in parallel with the capacitor 111. The secondary winding 110 of the transformer T2 is coupled to the diode 131 and through to the DC-AC inversion circuit 152. The source of the switch 103 is coupled to ground as well as to a second terminal of the DC input 102, and the drain of the switch 103 is coupled to the primary winding 112 of the transformer T2. A capacitor 111 is coupled across the input to the flyback circuit 108 such that one terminal of the capacitor 111 is coupled to one terminal of the primary winding 112 of the switch 103, and the second terminal of the capacitor 111 is coupled to the source of the switch 103 (i.e., ground).

The reactive power control circuit 138 comprises the switch 105 coupled to a cathode of the diode 144, a cathode of the diode 142, and a first end of a capacitor 140. The anode of the first diode 142 is coupled to a first output 166 of the DC-AC inversion circuit 152. The cathode of the second diode 144 is coupled to a second output 168 of the DC-AC inversion circuit 152. The second end of the capacitor 140 is coupled to the sources of switches 109 and 107 of the DC-AC inversion circuit 152.

The DC-AC inversion circuit 152 is coupled across the outputs of transformers T1 and T2. The DC-AC inversion circuit 152 comprises a capacitor 132, a diode 150, a diode 165, a switch 107 and a switch 109. The capacitor 132 is coupled in parallel with the diode 150 that is serially coupled switch 107. The diode 150 and switch 107 are coupled in parallel with the diode 165 that is serially coupled to the switch 109. A first node A1 is located between the diode 150 and the switch 107 forming a first output 166 of the DC-AC inversion circuit 152. A second node A2 is located between the diode 165 and the switch 109 that forms the second output 168 of the DC-AC inversion circuit 152. A capacitor 170 coupled in parallel across the first and second outputs (166 and 168) of the DC-AC inversion circuit 152 and also across one end of a "common mode" EMI (Electro Magnetic Interference) filter choke T3. A capacitor 185 is coupled across the other end of the choke T3, that outputs AC power to an AC output port 190. The choke T3, and the capacitors 170 and 185 form a low pass filter to remove frequencies not equal to the frequency of the desired output (e.g., 60 Hz for a mains frequency) in some embodiments.

The DC voltage from the DC input 102 is boosted by the flyback circuits 106 and 108 and then inverted by the DC-AC inversion circuit 152 and ultimately output to an AC output 190. The flyback circuits 106 and 108 are arranged in a parallel manner with respect to the load and the DC input 102. The input capacitor 104 is used for storing energy to facilitate an accurate DC-AC conversion process when using the DC input 102 that has a limited current generation capability. The DC input 102 may be a photovoltaic (PV) panel or some other source of DC power such as a wind turbine. During forward power operation, the second flyback circuit 108 with the "master" transformer T2 interleaved with the first flyback circuit 106 and "slave" transformer T1 create a DC voltage output to the DC-AC inversion circuit 152 by converting power from the DC input 102.

Voltage and current sensors may be disposed in the power converter 100 to measure the voltage bias and current flow at various components in the power converter 100. In operation, the controller (further discussed in FIG. 2), processes sensor signals to derive timing signals for the switches 101 and 103 to achieve timing synchronization and load balancing for the interleaved flyback circuits 106 and 108 as well as coordinating reactive power support. For example, sensors may be placed to measure or calculate energy stored in capacitor 140, the amount of power output from the flyback circuits 106 and 108, power output from the DC-AC inversion circuit 152, received power at the DC input 102, output power at the AC output port 190, and the like. The sensor data is sampled to calculate the timing of switches 101, 103, 105, 107, and 109 as well as diodes 150 and 165 for forward power generation as well as reactive power control. Coordinating the charging or discharging of energy from the capacitor 140 is achieved by selectively operating switches 101, 103, and 105. In some embodiments, the switches 101, 103, 105, 107, and 109 may be controlled using pulse width modulation (PWM).

In the non-reactive power mode, the power converter 100 is operated solely in the forward power operation. The desired PF in the non-reactive power mode for the power converter output is substantially unity (i.e., PF=1). Thus, switches 101, 103, 105, 107, and 109 are controlled to output a voltage and current waveform with no or zero phase shift. In some embodiments, the non-reactive power mode may store excess energy from the flyback circuit 106 into capacitor 140.

In forward power operation (i.e., forward power flow) for the non-reactive power mode and for specific time periods in the reactive power support mode, the slave and master circuits (flyback circuits 106 and 108) are operated to generate positive power. In such a mode, the master circuit (i.e., flyback circuit 108) is constantly in operation and the slave circuit (i.e., flyback circuit 106) is operated in selected interleaved periods. The periods of operation of the slave circuit may be near the mains peaks as will be discussed further in FIGS. 4 and 5 below. During the forward power operation mode, the reactive power control circuit 138 stores excess energy outputted from the slave circuit operation in capacitor 140.

In reverse power operation (i.e., periods of reverse power flow) of the reactive power support mode, both the slave and master circuits are OFF and the reactive power control circuit 138 is operated such that current is drawn from the grid-side back through the transformer T1 and energy is stored on the capacitor 104.

The selection between periods for the forward power operation and the reverse power operation of the reactive power support mode are determined based on a pre-determined or calculated phase shift for a desired PF. Thus, for a PF less than one, the control signals are generated such that the required converter output current is phase-shifted by the amount corresponding to the desired PF.

In some embodiments, the controller drives the switches in the power converter 100 such that a DC source (e.g., photovoltaic panel) coupled to the DC input 102 is biased at a maximum power point (MPP). In such an embodiment, when operating the power converter 100 for a PF less than one, the MPP algorithm is utilized in either operation mode.

Although the power converter 100 of FIG. 1 depicts two flyback circuits 106, 108 that are operating in parallel, the invention can be expanded to any number of flyback circuits coupled in parallel. Such examples for implementing flyback conversion are herein incorporated in their entirety and may be found in commonly assigned patent application U.S. Pat. App. 2009/0086514 entitled "Method and Apparatus for Providing Power Conversion Using an Interleaved Flyback Converter with Automatic Balancing" filed Sep. 28, 2007.

FIG. 2 is a block diagram of an exemplary controller 200 in accordance with one or more embodiments of the present invention. The controller 200 is operative to selectively energize the switches in the power converter 100.

The controller 200 comprises a central processing unit (CPU) 202 coupled to each of support circuits 204 and memory 208. The CPU 202 may be a form of processor, microprocessor, microcontroller including an application specific integrated circuit (ASIC). The support circuits 204 comprise well known circuits that support the functionality of the CPU 202 including power supplies, clock circuits, bus circuits, interface circuits and the like. The memory 208 stores the control software/instructions, operating system, and the like; that are executed by the CPU 202 to control the operation of the interleaved flyback circuits 106 and 108, reactive power control circuit 138, and DC-AC inversion circuit 152. To facilitate digital control, alternative embodiments may have sensors for monitoring flyback circuits 106 and 108 using analog-to-digital conversions (ADC) that may stand-alone or be part of the controller 200. In some embodiments, the controller 200 may also process received data from a grid monitoring circuit (not shown) and process external communications (e.g., for example, via a gateway using power line communications).

The memory 208 may be any form of digital storage used for storing data and executable software. Such memory includes, but is not limited to, random access memory, read only memory, disk storage, optical storage, and the like. The memory 208 stores computer readable instructions corresponding to a monitoring module 212, and power control module 214. The memory 208 may optionally include a maximum power point tracking (MPPT) module 217. The MPPT module 217 provides MPPT for both the forward power operation and reverse power operation. Additional embodiments may include an operating system 210 for facilitating communication between the CPU 202 and memory 208 as well as one or more databases 218 stored in memory 208.

The monitoring module 212 receives the voltage and current detection measurements from voltage and current sensors. In some embodiments, the monitoring module 212 converts the analog measurements from the sensors to digital data. In alternative embodiments, the power converter 100 may include ND converters coupled to sampling circuits of the sensors. The monitoring module 212 passes digital measurement data to the power control module 214 and the switch control module 216.

The power control module 214 determines the timing of the switches in the power converter 100 to provide real power as well as a corresponding reactive power support based on a desired PF in the reactive power support mode. The power control module 214 determines the periods of the forward power operation and reverse power operation. During the forward power operation in the non-reactive power mode, the flyback circuits 106 and 108 are driven to generate power with a PF near unity such that there is no phase shift.

In the reactive power support mode, there are time periods where forward power is generated, and time periods where reverse power is generated. During the periods of forward power generation, power is generated from the interleaved flyback circuits 106 and 108 to convert power from the DC input 102 to an AC output at the required PF. During time periods of reverse power operation for the reactive power support mode, the power control module 214 drives reactive power control circuit 138 to generate power flow while both flyback circuits 106 and 108 are OFF. Energy via the power control circuit 138 and the transformer T1 is stored in the capacitor 104.

For a current lag up to 180° degrees, a reverse power flow (i.e., reverse power operation) period starts at the zero crossing of the mains voltage and ends at the subsequent zero-crossing of the mains current. For a current lag from 180° to 360° degrees, the reactive power support mode begins a forward power flow (i.e., forward power operation) period at a voltage zero-crossing and ends at the subsequent current zero-crossing. The desired PF may be pre-determined, user-selectable, provided via an external communication via a gateway (e.g., from the commercial grid,) stored in the database, and the like. In some embodiments, the desired PF may also be computed using sampled output power data from the power converter 100 that is compared to the load (e.g., commercial AC grid).

The operation of the switch 105 is determined by time $T_{on}$ in the equation:

$$T_{on} = k/Vin^2 \tag{1}$$

In the equation 1 above, $T_{on}$ is the amount of time the switch 105 is in the ON position (i.e., the period that 105 is on for each switching cycle during the reverse power flow period), Vin is the input voltage at the AC output port 190, and k is a control variable. Vin is referred to as the input voltage since in the perspective of the reverse power operation (and reverse power flow), the AC output port 190 operates as an input to the power converter 100.

K is the variable that would be adjusted according to the amount of reactive power required (i.e., a set power factor and actual loading of power converter 100) for the reverse power operation in the reactive power support mode. K represents the relationship between the rate of change of current in an inductor as a function of time. For example, the value of k may be determined based on an inductance for transformer T1, a particular mains voltage (e.g., at the AC output port 190), and a desired switching frequency. In one embodiment, the reactive power control circuit 138 is controlled based on a constant frequency discontinuous current mode control scheme. Other embodiments have control schemes including critical conduction control (also known as boundary control mode) and continuous current control mode.

Figure 3:
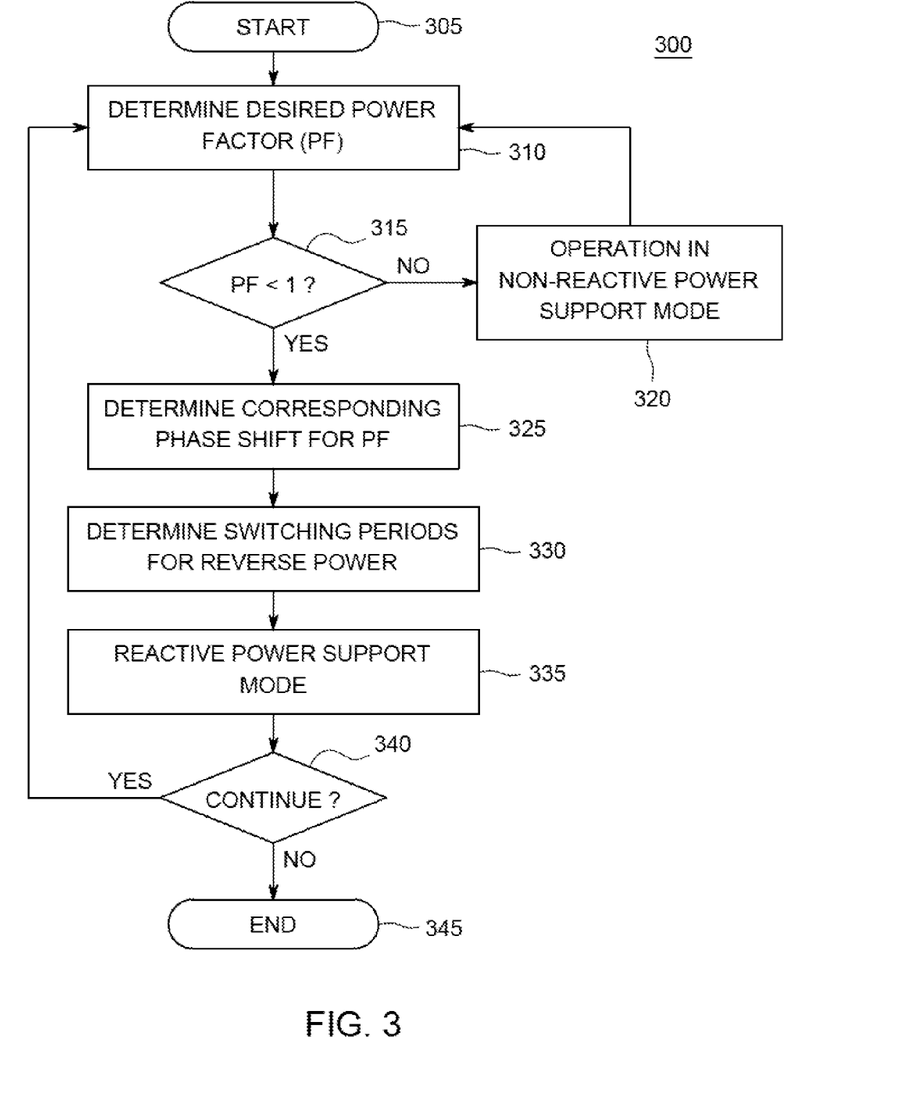
FIG. 3 is a flow diagram of an exemplary method in accordance with one or more embodiments of the present invention.

FIG. 3 is a flow diagram of an exemplary method 300 in accordance with one or more embodiments of the present invention. In one embodiment, the method 300 is implemented by the power converter 100 and controller 200 discussed above.

The method 300 begins at step 305 and continues to step 310. At step 310, a desired power factor is determined. The power factor may be pre-determined, received from user selection or other external communication such as a utility provider (e.g., the utility provider may communicate the information via the grid using power line communications). In other embodiments, the power factor is calculated using comparisons of the current output power of the power converter 100 and the load (e.g., the AC commercial grid).

Next at step 315, a determination is made as to whether the PF is less than unity. If substantially near or at unity (PF=1), the method 300 proceeds to step 320. If however, the PF is less than one, the method 300 proceeds to step 325.

At step 320, the power converter 100 is operated in the non-reactive power mode. In the non-reactive power mode, the power converter 100 generates real power with no phase shift. The switch 105 remains off and the flyback circuits 106 and 108 supply DC power to the DC-AC inversion circuit 152. In some embodiments, excess energy is stored in the capacitor 140 of the reactive power control circuit 138. The method 300 then reverts to step 310 to determine if the desired PF has changed.

At step 325, a determination is made as to the corresponding phase shift for the desired PF that is less than unity (e.g., PF=0.5). The corresponding phase shift may be retrieved from a list of predetermined values or calculated based on the PF. The method 300 then continues to step 330.

At step 330 the switching period for the switch 105 is determined. The determination includes calculating or determining the length of $T_{on}$ as per Equation 1 discussed above that corresponds to the period that switch 105 is turned ON for each switching cycle.

In some embodiments, the determination is based on measured voltage and current data that is received from respective voltage and current sensors in the power converter 100. The data may be converted to digital data in the power converter 100 using ND converters or transmitted as analog signals for conversion in the controller 200. The measured data includes the voltage across the storage capacitor 140, amount of energy output from flyback circuits 106 and 108. In some embodiments, the AC grid power is measured along with the voltage at the DC input 102 and AC output port 190. In some embodiments, the current data is calculated based on measured voltage values. Measured data may also include grid information using external communications from the grid monitoring circuit. In some embodiments, the grid monitoring circuit supplies a parameter to determine a requisite power factor for the reactive power.

In some embodiments, the determination of time periods in step 330 includes determining the amount of necessary current injection. The amount may be predetermined or calculated (e.g., based on the Equation 1 discussed above).

At step 335, the power converter 100 is operated in the reactive power support mode. During periods of forward power operation, forward power is generated as previously described. During periods of reverse power operation of the reactive power support mode, the flyback circuits 106 and 108 are off. In these periods, current is drawn from the reactive power control circuit 138 into the flyback converter 106. The flyback converter circuit 106 subsequently converts the current to DC. In embodiments, utilizing constant on-time discontinuous current control mode, the current is inherently controlled during the reverse power flow period (i.e., the duration of the reverse power flow period is a function of the discontinuous current control mode).

At step 340, the method 300 determines whether to continue operation. If determined to continue, the method 300 returns to step 310. If however, the method 300 is to discontinue operation, the method 300 ends at step 345.

Figure 4:
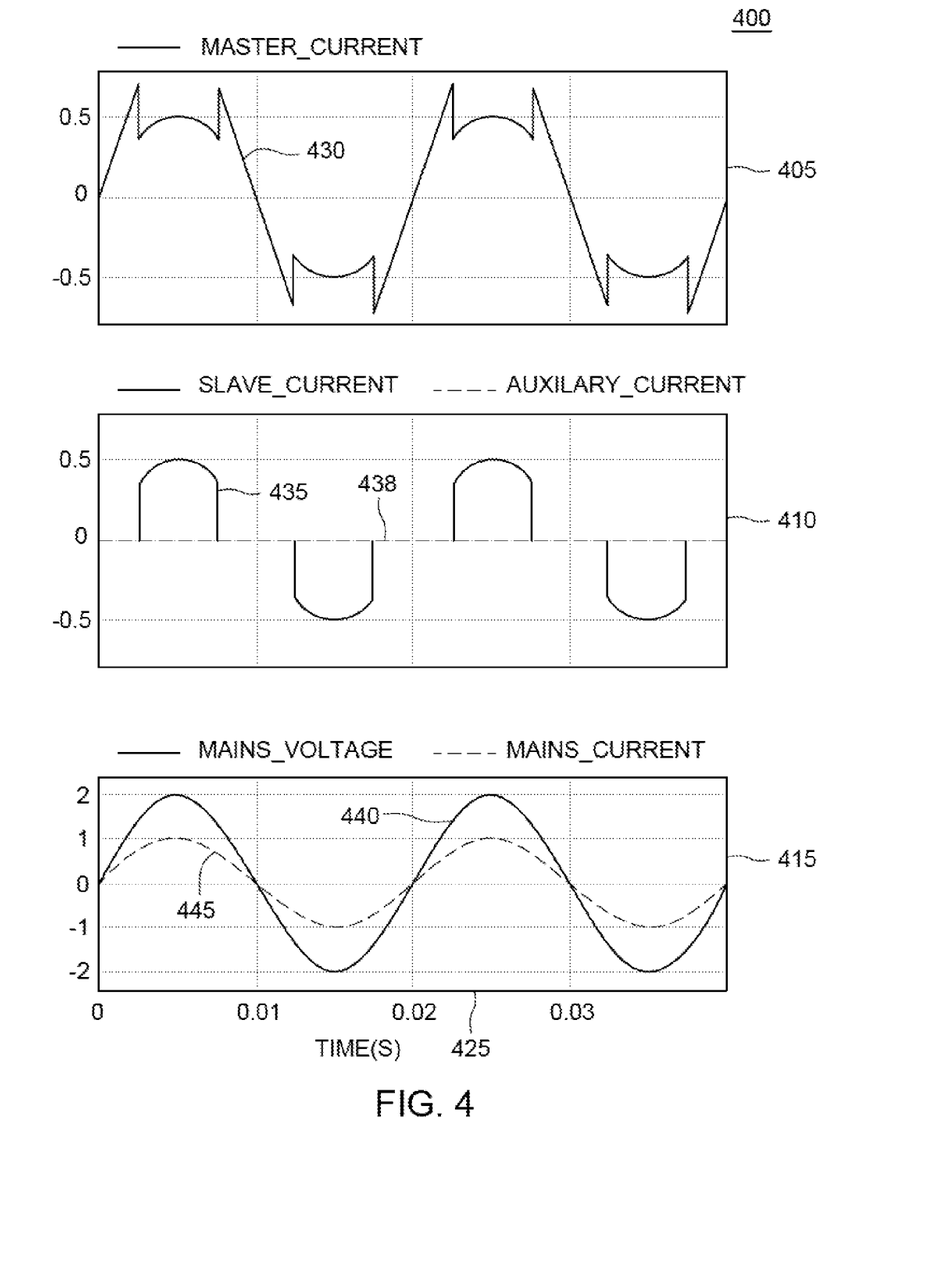
FIG. 4 is a set of graphs depicting output of a power converter operating in a non-reactive power mode with a power factor of one in accordance with one or more embodiments of the present invention.

FIG. 4 is a set of graphs 400 of output from a power converter operating in the non-reactive power mode with a power factor of one (PF=1) in accordance with one or more embodiments of the present invention. The graphs 400 depict power converter voltage and current waveforms output over time during the non-reactive power mode where the power converter 100 is in a forward power operation. A first graph 405 depicts the current output signal 430 from the second flyback (i.e., master) circuit 108. A second graph 410 depicts the current output signal 435 from the first flyback (i.e., slave) circuit 106 compared with the output signal 438 from the reactive power control circuit 138. The second graph 410 depicts the first flyback circuit 106 operating near the mains peak and the reactive power control circuit 138 contributes no current when PF=1. A third graph 415 of the graphs 400 depicts the in-phase waveforms of the mains voltage 440 and the mains current 445 that represent the generated AC power at the AC output port 190.

Figure 5:
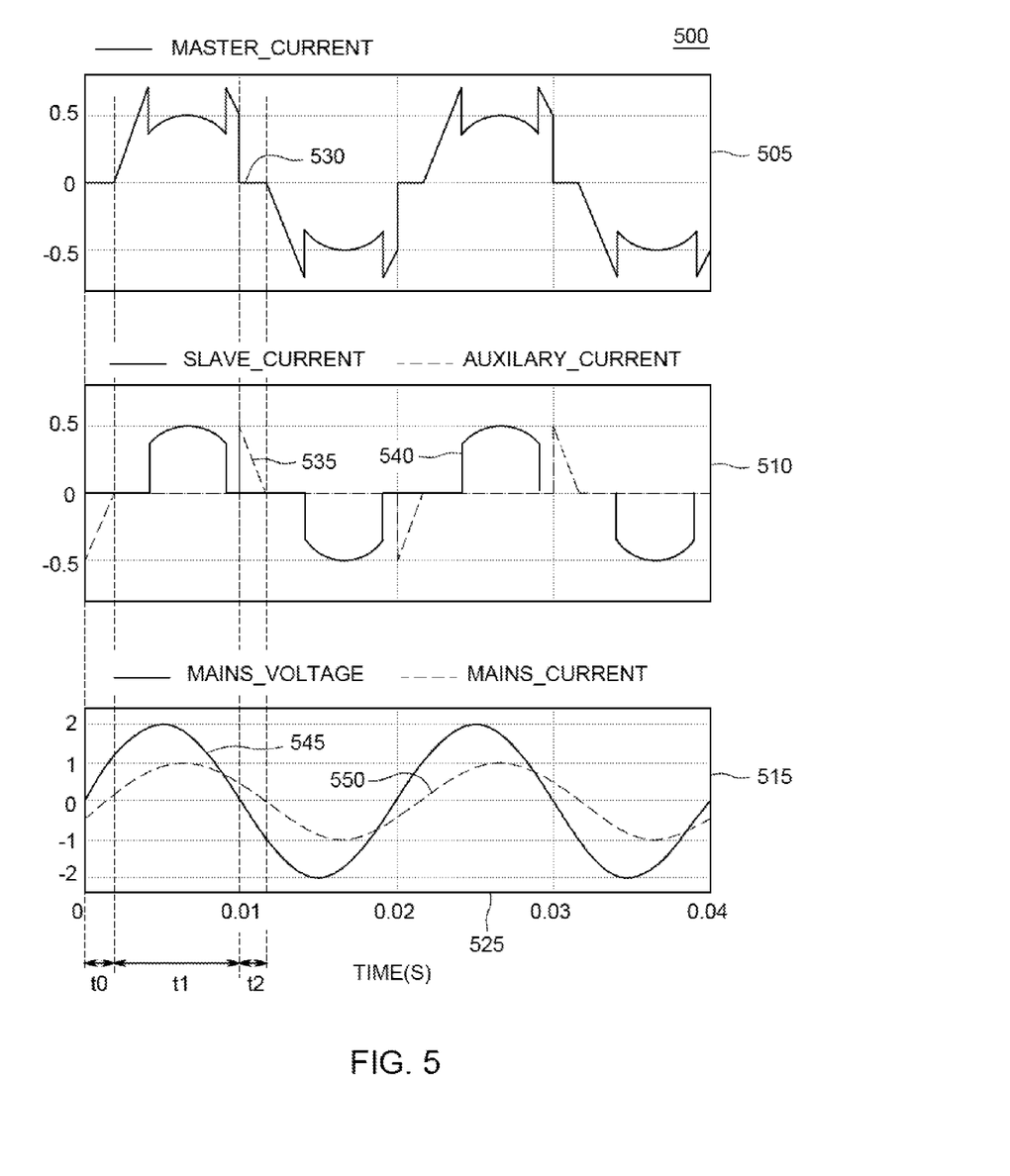
FIG. 5 is a set of graphs depicting output of a power converter operating in a reactive power support mode with a power factor less than one in accordance with one or more embodiments of the present invention.

FIG. 5 is a set of graphs 500 of output from a power converter operating in the reactive power support mode in accordance with one or more embodiments of the present invention. The graphs 500 depict operation of the converter 100 during the reactive power support mode that provides reactive power support. The graphs 500 depict power converter voltage and current waveforms versus time where there is a required exemplary power factor of 0.5. A first graph 505 depicts the output current signal 530 from the second flyback (e.g., master) circuit 108. A second graph 510 depicts the first flyback (e.g., slave) circuit current output 540 along with the reactive current output signal 535 from the reactive power control circuit 138. A third graph 515 shows the converter 100 delivering a slightly phase shifted output current 550 with respect to voltage 545 when generating reactive power (i.e., discharging capacitor 140). Neither the first or second flyback (106 and 108) circuits contribute any current for the time period t0 (about zero to 30 degrees in the example shown) when the polarity of the mains voltage is opposite to the polarity of the mains current. A period t0 starts at a mains voltage zero crossing and finishes at a mains current zero crossing such that the reactive power control circuit 138 is solely responsible for producing any current (shown as reactive current output signal 535) as a result of the reactive power control circuit 138. At time period t0, the power converter 100 is in the reverse power operation and a negative current is drawn through the reactive power control circuit 138. For a PF of 0.5, the current lags the voltage with a 30 degree phase shift. The duration of time period t0 is a ratio of the period of the line frequency. For example, with a line frequency of 50 Hz, the period is 20 milliseconds (ms). Thus, for the 30 degree phase shift (calculated by (30/360)×20 ms) results in a t0 duration equal to 1.67 ms. In another example, a line frequency is 60 Hz and the period is 16.7 ms. Thus in this example, for the 30 degree phase shift (calculated by (30/360)×16.7 ms) results in a t0 duration equal to 1.39 ms.

A period t1 begins at the end of t0 and finishes at the subsequent voltage zero-crossing. The flyback circuit 108 is operated throughout time period t1 to generate the portion of the output current 530 shown in the first graph 505 during time period t1. The flyback circuit 106 is operated during a portion of time period t1 (proximate the mains peaks) to generate the portion of the reactive output current 540 shown in graph 510 during time period t1. In time periods of forward power operation, such as time period t1, the reactive power control circuit 138 stores power. At the end of t1, a time period t2 begins and then ends at the subsequent current zero-crossing. Analogous to period t0, the flyback circuits 106 and 108 are off, and the reactive power control circuit 138 is operated as previously described.

In an example, during reverse power operation (e.g., 2.45% of power when the power factor=0.9) the flyback circuits 106 and 108 are off, and the reactive power control circuit 138 is turned on to flow reverse power through the power converter 100. During this period, there is a displacement between the zero-crossing of the current and zero crossing of the voltage being supplied by the converter 100. The reactive power control circuit 138 provides a current path for reverse power flow in a discontinuous current mode control scheme to perform as an auxiliary power converter during the period the flyback circuits 106 and 108 are off in the reactive power support mode. The flyback circuits 106 and 108 would be interleaved for periods of the forward power operation (e.g., mains forward power generation).

Figure 6:
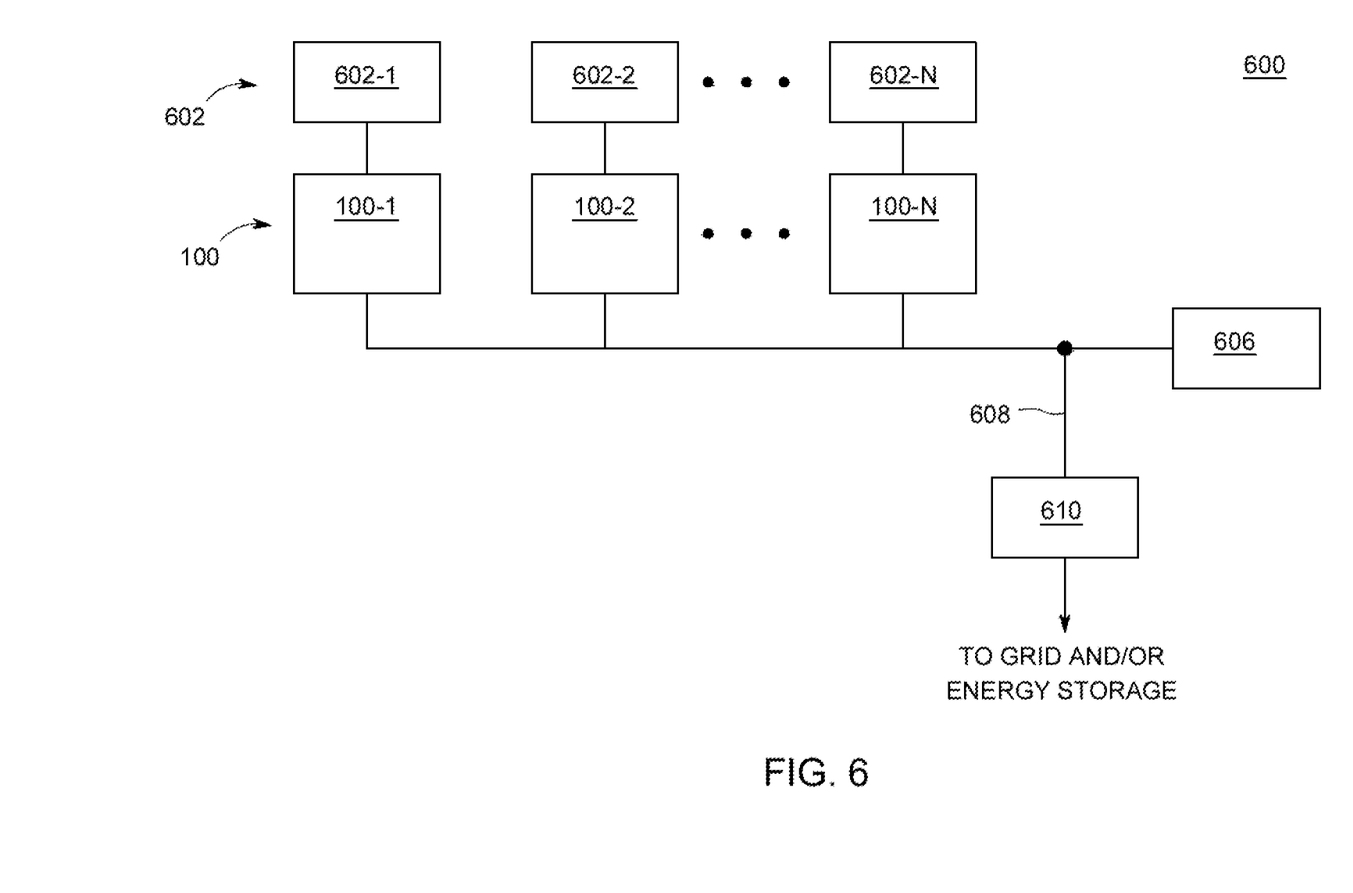
FIG. 6 is a block diagram of a system for power conversion comprising one or more embodiments of the present invention.

FIG. 6 is a block diagram of a system 600 for power conversion comprising one or more embodiments of the present invention. This diagram only portrays one variation of the myriad of possible system configurations and devices that may utilize the present invention. The present invention can be utilized in any system requiring reactive power support.

The system 600 comprises a plurality of distributed generators 602-1, 602-2 . . . 602-N, collectively referred to as generators 602, that include photovoltaic panels or other DC power generation sources, a plurality of power converters 100-1, 100-2 . . . 100-N, collectively referred to as power converters 100; a system controller 606; a bus 608; and a load center 610.

Each power converter 100-1, 100-2 . . . 100-N is coupled to a distributed generator or distributed generator string 602-1, 602-2 . . . 602-N, respectively; each of the power converters 100 described above is the converter 100 in FIG. 1. In some embodiments, each power converter 100 is externally coupled to a corresponding controller 200. In other embodiments, each controller 200 may be integrated with each corresponding power converter 100.

The power converters 100 are coupled to the system controller 606 via the bus 608. The system controller 606 is capable of communicating with the power converters 100 by wireless and/or wired communication (e.g., power line communications) for providing operative control of and/or monitoring the power converters 100 (for example, the system controller 606 may receive performance data from the power converters 100 via the bus 608). The power converters 100 are further coupled to the load center 610 via the bus 608.

The power converters 100 are each capable of converting the received DC power to AC output. The power converters 100 couple the generated AC output power to the grid or energy storage via the bus 608. The generated power may then be distributed for use, for example to one or more appliances, and/or the generated energy may be stored for later use, for example using batteries, heated water, hydro pumping, $H_2O$-to-hydrogen conversion, or the like. Each of the power converters 100 may provide reactive power control as previously described for a desired PF. The desired PF may be communicated to the converters 100 for example via the system controller 606. For example, a desired PF may be communicated from a utility to the converters 100 via the system controller 606 using power line communications.

The foregoing description of embodiments of the invention comprises a number of elements, devices, circuits and/or assemblies that perform various functions as described. These elements, devices, circuits, and/or assemblies are exemplary implementations of means for performing their respectively described functions.

While the foregoing is directed to embodiments of the present invention, other and further embodiments of the invention may be devised without departing from the basic scope thereof, and the scope thereof is defined by the claims that follow.

The invention claimed is:

1. An apparatus for converting power with reactive power control comprising:
   a plurality of flyback circuits, coupled in parallel;
   a DC-AC inversion circuit coupled across an output of each flyback circuit of the plurality of flyback circuits;
   a reactive power control circuit coupled (i) across the secondary winding of one flyback circuit of the plurality of flyback circuits, and (ii) across an output of the DC-AC inversion circuit; and
   a controller operative to coordinate timing of switches in each flyback circuit of the plurality of flyback circuits and the reactive power control circuit to generate AC output power of a desired power factor.

2. The apparatus of claim 1, wherein the controller operates the plurality of flyback circuits to generate forward power flow while the reactive power control circuit is off.

3. The apparatus of claim 2, wherein the reactive power control circuit generates a reverse power flow while the plurality of flyback circuits are off.

4. The apparatus of claim 1, wherein the reactive power control circuit is controlled based on a constant frequency discontinuous current mode.

5. The apparatus of claim 1, wherein the reactive power control circuit stores energy during a period of time the one flyback circuit of the plurality of flyback circuits is generating power.

6. The apparatus of claim 1, wherein the controller receives the desired power factor communicated from a power utility using power line communications (PLC).

7. A method for converting power with reactive power control comprising:
   determining a desired power factor (PF);
   driving a plurality of flyback circuits during a first period to generate a forward power flow based on the desired PF; and
   driving a reactive power control circuit during a second period to generate a reverse power flow via one flyback circuit of the plurality of flyback circuits, wherein the reactive power control circuit is coupled (i) across the secondary winding of the one flyback circuit of the plurality of flyback circuits, and (ii) across an output of a DC-AC inversion circuit coupled to the plurality of flyback circuits.

8. The method of claim 7, further comprising generating the forward power flow while a reactive power control circuit is off.

9. The method of claim 8, further comprising generating a reverse power flow while the plurality of flyback circuits are off and the reactive power control circuit is on.

10. The method of claim 7, further comprising controlling the reactive power control circuit based on a constant frequency discontinuous current mode.

11. The method of claim 7, further comprising controlling the reactive power control circuit based on a constant on-time discontinuous current control mode.

12. The method of claim 7, further comprising storing energy during a period of time the one flyback circuit of the plurality of flyback circuits is generating power.

13. The method of claim 7, wherein determining the desired PF further comprises receiving the desired PF in a communication from a power utility using power line communication (PLC).

14. A system for converting power with reactive power control comprising:
   a plurality of photovoltaic (PV) modules;
   a plurality of power converters coupled in a one-to-one correspondence with the plurality of PV modules, wherein each power converter comprises:
      a plurality of flyback circuits, coupled in parallel;
      a DC-AC inversion circuit coupled across an output of each flyback circuit of the plurality of flyback circuits;
      a reactive power control circuit coupled (i) across the secondary winding of one flyback circuit of the plurality of flyback circuits, and (ii) across an output of the DC-AC inversion circuit; and
      a controller operative to coordinate timing of switches in each flyback circuit of the plurality of flyback circuits and the reactive power control circuit to generate AC output power of a desired power factor.

15. The system of claim 14, wherein the controller operates the plurality of flyback circuits to generate forward power flow while the reactive power control circuit is off.

16. The system of claim 15, wherein the reactive power control circuit generates a reverse power flow while the plurality of flyback circuits are off.

17. The system of claim 15, wherein the reactive power control circuit is controlled based on a constant frequency discontinuous current mode.

18. The system of claim 15, wherein the reactive power control circuit stores energy during a period of time the one flyback circuit of the plurality of flyback circuits is generating power.

19. The system of claim 15, wherein the controller receives the desired power factor communicated from a power utility using power line communications (PLC).

20. The system of claim 15, wherein coordinating timing of switches further comprises operating the reactive power control circuit to draw current when no other power is supplied from the plurality of flyback circuits.

* * * * *